United States Patent [19]

Esskuchen et al.

[11] Patent Number: 4,993,040
[45] Date of Patent: Feb. 12, 1991

[54] RING LASER GYRO

[75] Inventors: Uwe Esskuchen, Hanau; Werner Hansli, Alsbach, both of Fed. Rep. of Germany

[73] Assignee: Honeywell Regelsysteme GmbH, Fed. Rep. of Germany

[21] Appl. No.: 529,249

[22] Filed: May 25, 1990

[30] Foreign Application Priority Data

Jun. 2, 1989 [DE] Fed. Rep. of Germany ....... 3918048

[51] Int. Cl.$^5$ ........................................... H01S 3/083
[52] U.S. Cl. ........................................ 372/94; 372/61
[58] Field of Search ............................. 372/94, 61, 87; 356/350

[56] References Cited

FOREIGN PATENT DOCUMENTS 61-170085A 4/1986 Japan.
1536081 10/1977 United Kingdom.

Primary Examiner—Léon Scott, Jr.
Attorney, Agent, or Firm—Haugen and Nikolai

[57] ABSTRACT

A ring laser gyro having a triangular-shaped block design (10) includes a cathode (24,26) on each side leg of the triangular-shaped block and one anode (28) on the base leg of the triangular-shaped block. Furthermore, the anode (28) is connected via connecting bores (36,38) to gas reaming bores (30,32) in the corner points of the block in order to pass away ions and electrons of the plasma from mirrors (18,20) arranged in the corner points of the block.

3 Claims, 1 Drawing Sheet

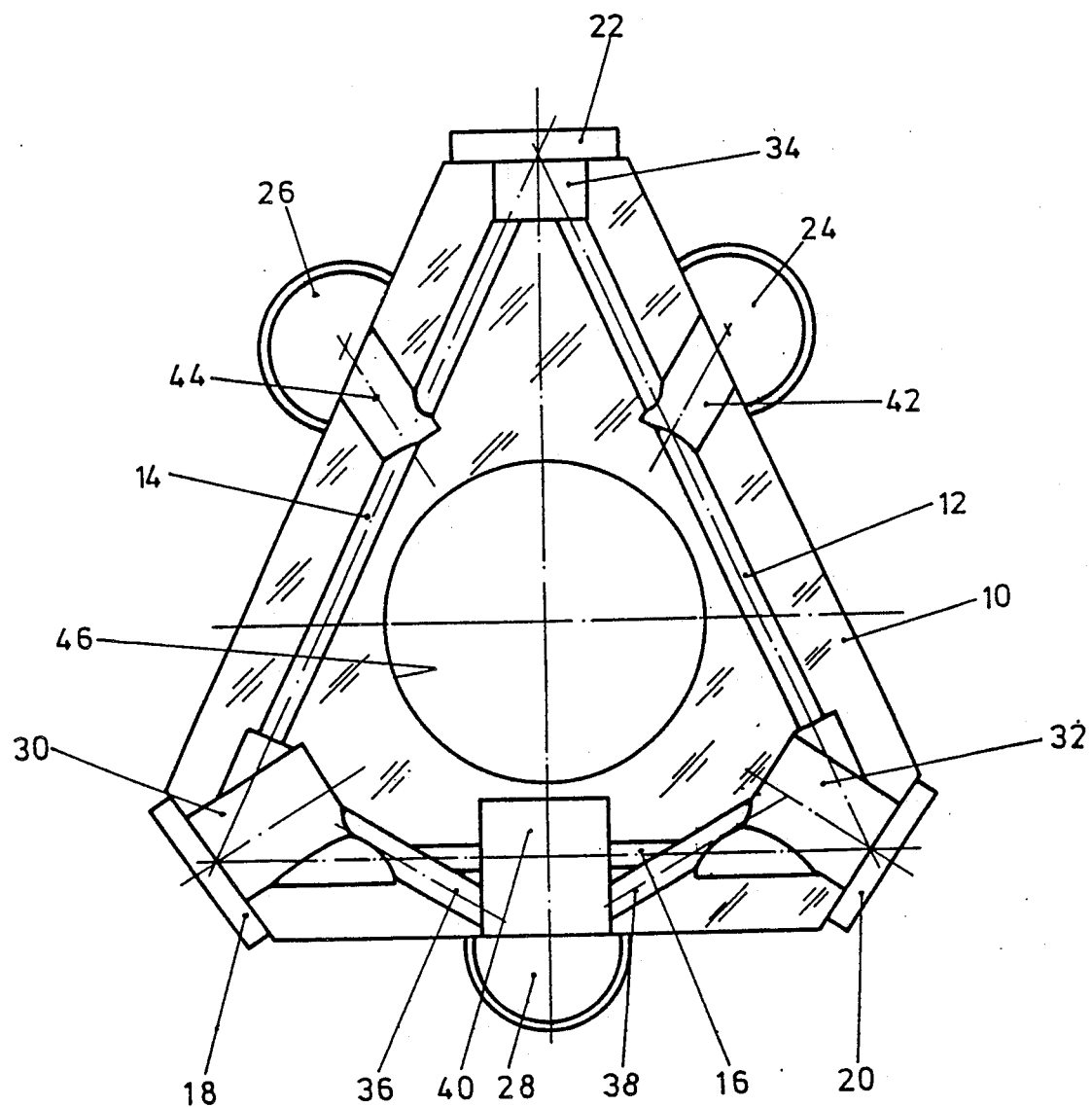

RING LASER GYRO

BACKGROUND OF THE INVENTION

The present invention relates generally to a ring laser gyro and, more particularly, to a ring laser gyro comprising a triangular-shaped block design and a symmetrical electrode arrangement on the three sides of the triangular-shaped block for producing two counter propagating laser beams and further comprising gas reaming bores wherein the electrodes are connected by the gas reaming bores inclined to the base leg of the block.

Such a ring laser gyro is known, e.g., from German Patent DE-OS No. 28 39 066. There, symmetrical to the center line of a triangular-shaped block design, two anodes are arranged on the side legs of the laser block and one cathode is arranged on the base leg of the laser block. In this known design both partial gas discharge passages between the anodes and the cathode extend via corner points of the block. Mirrors having a sensitive high reflecting coating are arranged in the corner points. Those mirrors are degraded by the bombardment with ions or electrons respectively from the gas plasma which results in a reduced useful life of the ring laser gyro. In order to prevent the deterioration of the mirrors it is already known to provide a barrier in front of each mirror so that the mirror is isolated from the gas discharge path (see, for example, French Patent No. 20 30 688).

SUMMARY OF THE INVENTION

It is the primary object of the present invention to increase the life of a ring laser gyro by a design of the laser block in accordance with the invention which eliminates the need for separate elements.

The invention provides special connecting bores by which the charged particles of the plasma at their travelling between the electrodes are passed away from the corner mirrors which results in an increased life of the ring laser gyro.

In a further aspect of the invention, a ring laser comprising two cathodes and one anode allows reduction of the current density on the cathodes so as to prevent sputtering effects to a great extent. Moreover, outgasing of the cathode material effected by the ion bombardment and, therefore, gas contamination is reduced which also results in an increased life of the ring laser gyro.

Further advantageous embodiments of the inventive ring laser gyro will become apparent to those skilled in the art from the description of the preferred embodiment, drawing and claims herein.

BRIEF DESCRIPTION OF THE DRAWINGS

The sole FIGURE shows a top view of a ring laser gyro as provided by the present invention. One embodiment of the inventive ring laser gyro shall be further described with reference to the sole FIGURE.

DESCRIPTION OF THE PREFERRED EMBODIMENT

According to the sole FIGURE a triangular-shaped equal sided laser block 10 comprises bores 12 14 and 16 parallel to its side walls which bores are closed in the corner points by mirrors 18, 20, 22 so that a cavity resonator is formed. In order to produce two counter propagating laser beams and to ignite a gas discharge symmetrical to the center line of the equal-sided triangle on both side legs of the block 10 two cathodes 24 and 26 are provided and on the base leg of the block one anode 28 is provided.

At the corner points of the laser block 10 the bores 12, 14 and 16 open into gas reaming bores 30, 32 and 34 by which the contained gas volume is enlarged.

Oblique connecting bores 36, 38 are inclined with respect to the base leg of the equal-sided laser block 10 and they connect a cut-out 40 adjacent to the anode 28 to the gas reaming bores 30 and 32 whereat they cross the bore 16 forming part of the laser path. Ions and electrons of the plasma in this manner are passed away from the mirrors 18 and 20 on their way from and to the anode 28.

The cathodes 24 and 26 are connected to the bores 12 and 14 via oblique cut-outs 42 and 44 whereat those cut-outs are inclined towards the gas discharge path.

A circular-shaped central cut-out 46 is provided within the laser block 10 and serves to receive a vibration device in order to impart to the ring laser gyro an oscillating back and forth motion as is well known in the art.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. In a ring laser gyro having a triangular-shaped block and a symmetrical electrode arrangement on three sides of said triangular block, including a base leg and side legs, said block having mirrors and gas reaming bores in corner points of said triangular block, and a laser path parallel to the legs of said triangular block, the improvement comprising: connecting bores connecting the electrode on said base leg to the adjacent gas reaming bores wherein the connecting bores are inclined to said base leg of the block and at an angle to the laser path.

2. The improved ring laser gyro of claim 1, wherein the electrode arranged on the base leg is an anode and the electrodes arranged on the side legs of the triangular-shaped block are cathodes, wherein the resulting cathode/anode arrangement provides a gas discharge path.

3. The improved ring laser gyro of claim 2, wherein the cathodes are connected to the laser path via oblique bores with said oblique bores being tilted with respect to the gas discharge path provided by the cathode/anodes arrangement.

* * * * *